United States Patent [19]
Yamaguchi et al.

[11] Patent Number: 5,898,048
[45] Date of Patent: Apr. 27, 1999

[54] POLYIMIDE POWDER AND PROCESS FOR PRODUCING POWDER MOLDED BODY

[75] Inventors: Hiroaki Yamaguchi; Fumio Aoki; Akinori Shiotani, all of Ichihara, Japan

[73] Assignee: Ube Industries, Ltd., Yamaguchi, Japan

[21] Appl. No.: 08/831,971

[22] Filed: Apr. 2, 1997

[30] Foreign Application Priority Data

May 5, 1996 [JP] Japan ................................. 8-083862
May 31, 1996 [JP] Japan ................................. 8-138550

[51] Int. Cl.$^6$ ............................ C08G 69/26; B32B 27/28
[52] U.S. Cl. ...................... 528/353; 528/289; 528/339; 523/205; 523/206; 428/407; 264/319
[58] Field of Search ................. 528/353, 339, 528/289; 523/205, 206

[56] References Cited

U.S. PATENT DOCUMENTS

| | | | |
|---|---|---|---|
| 3,376,260 | 4/1968 | Fritz ......................................... | 528/353 |
| 3,413,394 | 11/1968 | Jordan ..................................... | 528/353 |
| 4,413,117 | 11/1983 | Reiter et al. ............................ | 528/497 |
| 4,622,384 | 11/1986 | Manwiller .............................. | 528/353 |
| 4,755,428 | 7/1988 | Noda et al. .............................. | 428/402 |
| 4,755,555 | 7/1988 | Manwiller et al. ...................... | 528/353 |

FOREIGN PATENT DOCUMENTS

| | | |
|---|---|---|
| 39-22196 | 10/1964 | Japan . |
| 39-30060 | 12/1964 | Japan . |
| 43-27635 | 11/1968 | Japan . |
| 49-5737 | 2/1974 | Japan . |
| 57-190021 | 11/1982 | Japan . |
| 58-49726 | 3/1983 | Japan . |
| 61-113620 | 5/1986 | Japan . |
| 61-163937 | 7/1986 | Japan . |
| 61-241326 | 10/1986 | Japan . |
| 61-250030 | 11/1986 | Japan . |
| 64-87307 | 3/1989 | Japan . |
| 1-242622 | 9/1989 | Japan . |
| 1-266134 | 10/1989 | Japan . |

*Primary Examiner*—Tae Yoon
*Attorney, Agent, or Firm*—Finnegan, Henderson, Farabow, Garrett & Dunner, L.L.P.

[57] ABSTRACT

Aromatic polyimide powder wherein a solid portion consisting of a highly heat resistant crystalline aromatic polyimide is covered with a coating layer of an amorphous polyimide, and a process for producing polyimide powder molded bodies by compression molding of the powder. The polyimide powder has satisfactory secondary molding workability, and molding thereof gives molded bodies which retain heat resistance and dimensional stability while having high mechanical strength and elongation.

8 Claims, 3 Drawing Sheets

POLYIMIDE POWDER AND PROCESS FOR PRODUCING POWDER MOLDED BODY

BACKGROUND OF THE INVENTION

1. Field of the Invention

The present invention relates to a process for producing an aromatic polyimide powder molded body which maintains an extremely high level of heat resistance while also having particularly high mechanical characteristics such as elongation, strength, etc., and which contains, for example, a 3,3',4,4'-biphenyltetracarboxylic acid component as major units, a 2,3,3',4'-biphenyltetracarboxylic acid component as minor units and para-phenylenediamine as an aromatic diamine component, as well as to an aromatic polyimide powder which is used for the production process.

2. Description of the Related Art

Conventional processes for producing polyimide powder molded bodies comprising 3,3',4,4'-biphenyltetracarboxylic acid components and para-phenylenediamine components are described, for example, in Japanese Unexamined Patent Publication No. 61-241326 and Japanese Unexamined Patent Publication No. 1-266314.

These documents present molded bodies with excellent mechanical characteristics such as heat resistance, dimensional stability and compressive strength.

However, the polyimide powders described in these publicly known documents have essentially unmeasured melting points (or glass transition points), and because of inadequate fusion between the powder during hot compression molding, some of the mechanical characteristics, particularly flexural strength and tensile strength, have not always been satisfactory.

Other indicated problems include low productivity by loss during molding, because the elongation, flexural strength and tensile strength have been insufficient during secondary working of the molded bodies into various shapes by cutting, etc.

Consequently, attempts have been made to improve the fusibility between the powder during hot compression molding, in order to increase the elongation and the mechanical characteristics of such molded bodies.

For example, one attempted process has been compression molding polyimide powder obtained by mixing a thermoplastic polyimide with a polyimide comprising a 3,3',4,4'-biphenyltetracarboxylic acid component and a para-phenylenediamine component, but this has also been associated with certain drawbacks, since uniform mixture of the two components with totally different properties is difficult, and the mechanical strength and elongation of the resulting molded bodies have still not reached satisfactory levels, while the heat resistance is in fact lower.

Consequently, according to the prior art it has not been possible to obtain aromatic polyimide powder molded bodies with satisfactory heat resistance, mechanical strength and elongation.

SUMMARY OF THE INVENTION

It is an object of the present invention to provide a process for producing aromatic polyimide powder molded bodies which have high levels for mechanical characteristics such as elongation, strength, etc., without the reduction in heat resistance, dimensional stability or compressive strength inherent in publicly known polyimide powder molded bodies of the prior art which are composed mainly of 3,3',4,4'-biphenyltetracarboxylic acid components and para-phenylenediamine.

As a result of diligent research aimed at achieving the object stated above, the present inventors have completed the present invention upon the finding that the above-mentioned contradictory physical properties may both be achieved by a specific combination and structure of a highly heat resistant crystalline aromatic polyimide and an amorphous polyimide, as the polyimide powder.

In other words, the present invention provides a process for producing a polyimide powder molded body comprising filling a mold with an aromatic polyimide powder wherein a solid portion consisting mainly of a highly heat resistant crystalline aromatic polyimide with no observed glass transition point (Tg) in the temperature range from room temperature to 400° C. is covered with a coating layer consisting of an amorphous polyimide, and which can be considered to be of high molecular weight by measurement based on the inherent viscosity (30° C., 0.5 g/100 ml concentrated sulfuric acid) and for which a degree of crystallinity is confirmed by wide-angle X-ray scattering, and then applying pressure and temperature either simultaneously or separately to accomplish molding.

The present invention further provides an aromatic polyimide powder comprising a solid portion consisting mainly of a highly heat resistant crystalline aromatic polyimide with no observed glass transition point (Tg) in the temperature range from room temperature to 400° C. which is covered with a coating layer consisting of an amorphous polyimide, which can be considered to be of high molecular weight by measurement based on the inherent viscosity (30° C., 0.5 g/100 ml concentrated sulfuric acid), and it has a degree of crystallinity confirmed by wide-angle X-ray scattering.

DESCRIPTION OF THE PREFERRED EMBODIMENTS

The aromatic polyimide powder of the invention consists of particles wherein a solid portion consisting mainly of a highly heat resistant crystalline aromatic polyimide with no observed glass transition point (Tg) in the temperature range from room temperature to 400° C., preferably a polyimide solid portion derived from a 3,3',4,4'-biphenyltetracarboxylic acid component and para-phenylenediamine, is covered with a coating layer consisting of an amorphous polyimide, and which can be considered to be of high molecular weight by measurement based on the inherent viscosity (30° C., 0.5 g/100 ml concentrated sulfuric acid) and has a degree of crystallinity confirmed by wide-angle X-ray scattering, and the particles preferably have a two-layer structure in which the surface of highly heat resistant crystalline aromatic polyimide particles are covered with a coating layer consisting of an amorphous polyimide polymer, wherein the aforementioned inherent viscosity is at least 0.4, and especially 0.5–3. In other words, it is a powder with a two-layer structure wherein the inner layer section of the particles are made of a crystalline aromatic polyimide while the outer layer is a thin layer of an amorphous polyimide.

The coating with the aforementioned amorphous polyimide preferably covers roughly the entire surface of the crystalline aromatic polyimide particles, but this is not essential and the crystalline aromatic polyimide particle surface may form the surface layer of a portion (for example, no greater than 40%) of the particle surface of the polyimide powder.

The polyimide powder of the invention undergoes sufficient polymer fusion between the powder particle surfaces during molding to achieve mutual fusion for bonding, and this is believed to provide the resulting molded product with a balance of high heat resistance, mechanical strength and elongation.

The aromatic polyimide powder of the invention will now be explained with reference to FIG. 1 which is a cross-sectional transmission electron micrograph of an embodiment of powder according to the invention, FIG. 2 which is a cross-sectional micrograph of polyimide powder according to the prior art, and FIG. 3 which shows X-ray diffraction spectra by wide-angle X-ray spectrometry (WAXS) for this embodiment of powder according to the invention and polyimide powder according to the prior art.

Figure 1:
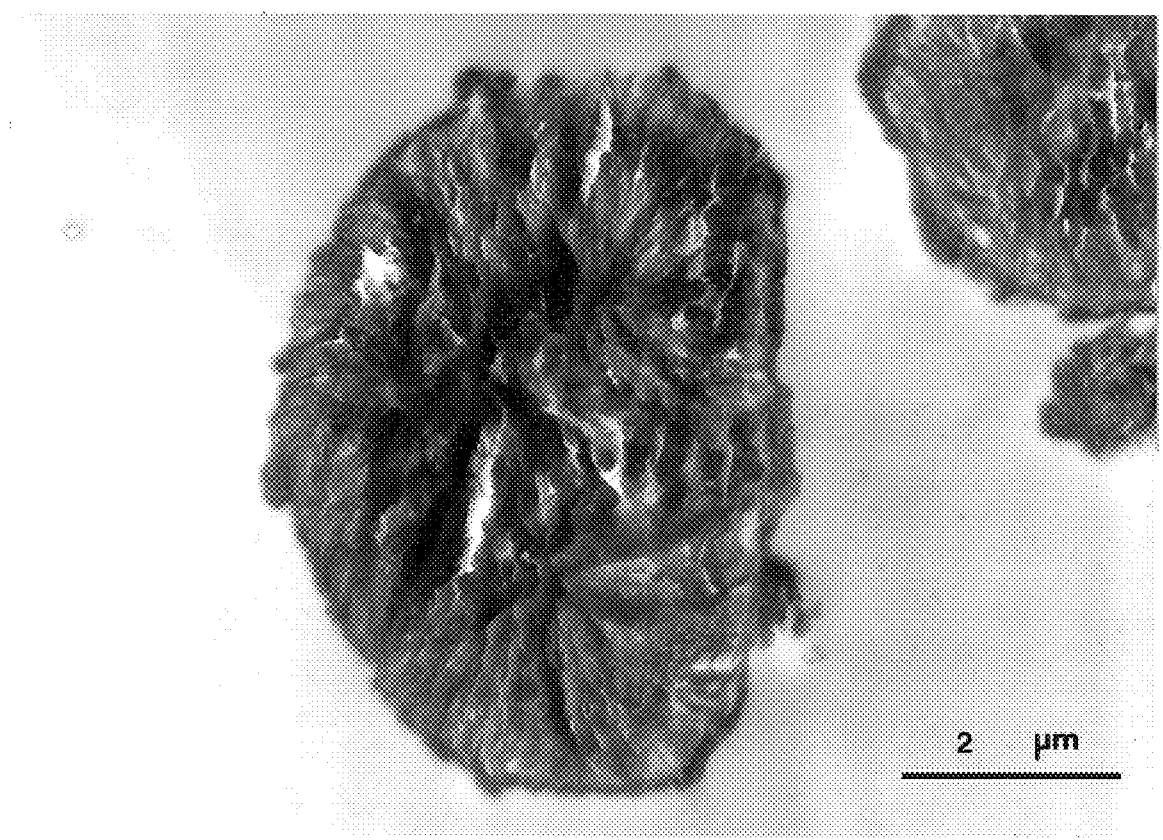
FIG. 1 is a cross-sectional transmission electron micrograph of an embodiment of powder according to the invention.
Figure 2:
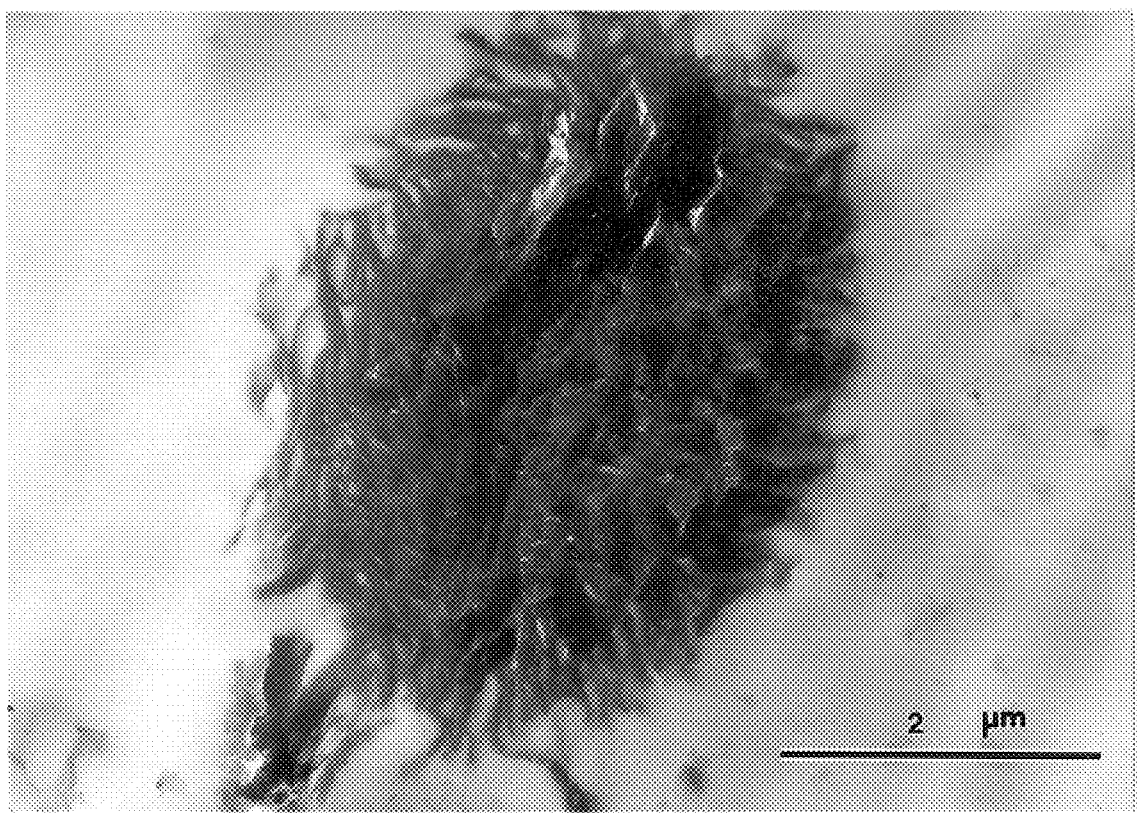
FIG. 2 is a cross-sectional transmission electron micrograph of an embodiment of powder according to the prior art.
Figure 3:
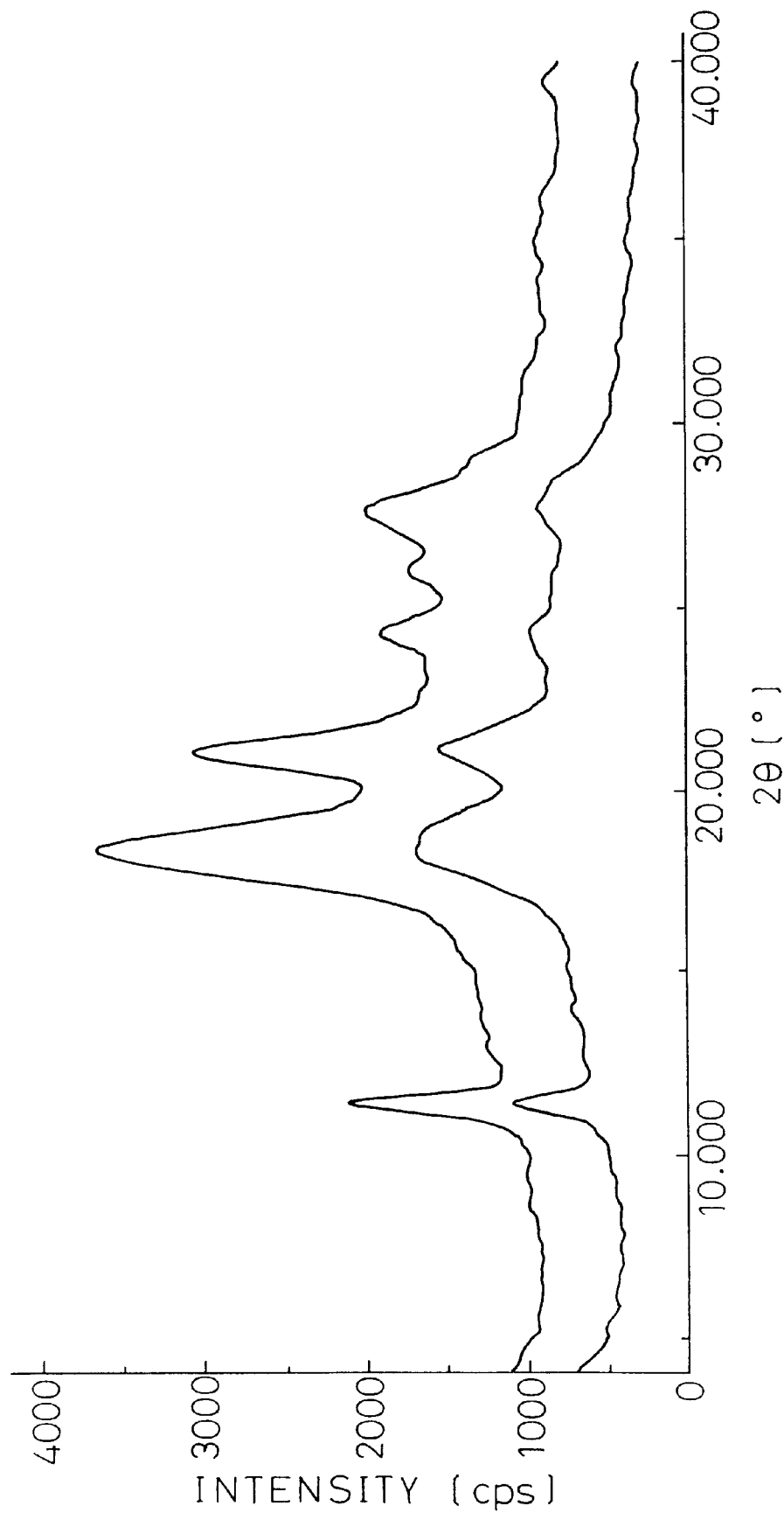
FIG. 3 shows X-ray diffraction spectra by wide-angle X-ray scattering (WAXS) for an embodiment of powder according to the invention and an embodiment of powder according to the prior art. The high-intensity spectral pattern represents the powder of the prior art, and the low-intensity spectral pattern represents the powder of the invention.

In FIG. 1, the inner layer section of the polyimide powder of the invention clearly has a crystalline structure, similar to FIG. 2, while the outer layer has a structure of a thin covering over roughly the entire surface, the coating layer being of an amorphous aromatic polyimide which is different from the inner layer.

Also, FIG. 3 clearly shows that the powder of the invention which has the amorphous aromatic polyimide introduced therein has a lower degree of crystallinity than conventional powder (described in Comparative Example 1 below). Observation of their intensities [cps] and peak positions (2θ) reveals peaks for the crystalline polyimide at 2θ of 11.2929, 18.4398, 21.0729, 23.1386, 24.2767, 25.7922, 27.6764 and 29.0357.

The aromatic polyimide powder of the invention may preferably be powder composed of a high molecular weight aromatic polyimide with an average particle size of 0.5–100 μm, especially 1–50 μm for primary particles, which may be produced by the following process, i.e. polymerization and imidization of approximately equimolar amounts of an aromatic tetracarboxylic acid component composed mainly of a biphenyltetracarboxylic acid such as 3,3',4,4'-biphenyltetracarboxylic acid and 2,3,3',4'-biphenyltetracarboxylic acid, their acid dianhydrides and esters of these acids with lower alcohols, and containing the 2,3,3',4'-biphenyltetracarboxylic acid in a proportion of between 0.5 and 30 molar percent, especially between 1 and 25 molar percent, and particularly between 1.5 and 20 molar percent, of the total amount of tetracarboxylic acid components, and an aromatic diamine component containing para-phenylenediamine at a proportion of at least about 80 molar percent of the total amount of diamine components, by a publicly known method in an organic polar solvent, and then recovering the powder from the reaction system.

The aromatic polyimide powder according to the present invention can thus be obtained by forming fine particles of a highly heat resistant crystalline aromatic polyimide upon polymerization and imidization and insolubilizing an amorphous aromatic polyimide to precipitate a powder, and then, recovering the powder.

According to the process described above, it is possible to easily form uniform particles of a polyimide powder with a two-layer structure without any further conditions to the procedures for polymerization and imidization, and with a low amount of residual reaction solvent.

The aforementioned aromatic tetracarboxylic acid component preferably consists only of an 3,3',4,4'-biphenyltetracarboxylic acid and a 2,3,3',4'-biphenyltetracarboxylic acid in the proportions mentioned above from the standpoint of obtaining a powder molded body with a high level of physical properties (especially mechanical strength and heat resistance during use), but part of the biphenyltetracarboxylic acid, preferably no more than 20 molar percent, may be replaced with another aromatic tetracarboxylic acid.

Examples of such aromatic tetracarboxylic acids include pyromellitic acid and its acid dianhydride, 3,3',4,4'-benzophenonetetracarboxylic acids and their acid dianhydrides, 2,2'-bis(3,4-dicarboxyphenyl) propane and its acid dianhydride, bis(3,4-dicarboxyphenyl) methane and its acid dianhydride, and bis(3,4-dicarboxyphenyl) ether and its acid dianhydride.

Also, although the aforementioned para-phenylenediamine is preferably used alone for physical properties of the powder molded body and ease of handling for polymerization and imidization, a small portion thereof, preferably no more than about 20 molar percent, may be replaced with a diamine such as another aromatic diamine or diaminopolysiloxane, so long as the physical properties are not substantially impaired.

Examples of such diamines include meta-phenylenediamine, 4,4'-diaminodiphenyl ether, 4,4'-diaminodiphenylmethane, 4,4'-diaminodiphenylpropane, bis (4-aminophenyl) dimethylsilane, 1,4-bis(4-aminophenoxy) benzene and 1,3-bis(4-aminophenoxy) benzene.

According to the invention, a mold is filled with the aforementioned aromatic polyimide powder and pressure and heat are applied either simultaneously or separately for molding to produce a polyimide powder molded body.

The aforementioned aromatic polyimide powder may be used directly in that form, or a pre-mold may be formed from the powder, to produce a molded body by compression molding at a molding temperature of 200–600° C., preferably 250–550° C. and more preferably 300–500° C. and a molding pressure of 300–10,000 $Kg/cm^2$, preferably 500–8000 $Kg/cm^2$ and more preferably 600–6000 $Kg/cm^2$.

Alternatively, the aromatic polyimide powder which has been thoroughly dried (by pre-calcining) or a premolded body thereof which has been compression molded at a molding temperature of room temperature to 350° C. and a molding pressure of 300–10,000 $Kg/cm^2$, preferably 500–8000 $Kg/cm^2$ and more preferably 600–6000 $Kg/cm^2$ into a molded body may then be subjected to post-sintering at 200–600° C. and preferably 250–500° C. under no compression. Molded bodies obtained by this process have inferior overall characteristics than molded bodies obtained by the hot compression molding described above, but they are characterized by excellent productivity since they allow parallel processing.

Also, in the process for producing the powder molded body of the invention, a filler, for example an inorganic filler such as silica, mica, kaolin, asbestos, boron nitride, aluminum oxide, iron oxide, graphite, molybdenum sulfide or iron sulfide, or an organic filler such as a fluororesin, may be mixed with the polyimide powder (by either internal mixing or external mixing).

According to the production process of the invention, the apparatus used to produce the polyimide powder mold may be, for example, a 4-column hydraulic press, a high-pressure hot press, etc.

The aforementioned pre-molded body is preferably formed by a process using, for example, a rotary press or a tabletting machine.

The polyimide powder molded body obtained by the process of the invention is obtained from the aforementioned specific aromatic polyimide powder, and it has vastly improved mechanical strength, including flexural strength and/or tensile strength, as well as elongation, without lowering the excellent heat resistance and dimensional stability of conventional publicly known polyimide powder molded bodies obtained from 3,3',4,4'-biphenyltetracarboxylic acids and para-phenylenediamine.

Examples of the invention are provided below.

In the examples which follow, the physical properties of the polyimide powder molded bodies were measured according to the test methods described below.

(i) Flexural test: ASTM D-790 The flexural strength ($Kg/cm^2$) was determined at a measuring temperature of 23° C.

(ii) Tensile test: ASTM D-638 The tensile strength ($Kg/cm^2$) was determined at a measuring temperature of 23° C.

EXAMPLE 1

After addition of 1275 g of N-methyl-2-pyrrolidone (NMP) and 60.47 g (0.559 mole) of para-phenylenediamine (PPD) to a 2 L four-neck separable flask equipped with a stirrer, reflux condenser (with moisture separator), thermometer and nitrogen inlet tube at 60° C., 148.08 g (0.503 mole) of 3,3',4,4'-biphenyltetracarboxylic acid (s-BPDA) and 16.45 g (0.0559 mole) of 2,3,3',4'-biphenyltetracarboxylic acid (a-BPDA) were added to the mixture almost simultaneously while agitating with a nitrogen gas current, and the mixture was then heated to 100° C. over about 20 minutes to prepare a uniform solution of each monomer component in the NMP solvent.

Next, agitation of the solution with the nitrogen gas current was continued while refluxing the solvent and the produced water, and the mixture was heated to 190° C. over about 30 minutes while removing the produced water. Deposition of the aromatic polyimide began from an internal temperature of around 165° C. After the internal temperature reached 190° C., the reaction was continued for 3 hours and then the reaction was terminated.

The reaction solution was then cooled and the aromatic polyimide powder filtered out, after which the powder was washed with acetone and subjected to further drying in a vacuum drier at 150° C. for 10 hours, followed by normal pressure drying at 300° C. for 30 minutes, to obtain 202.1 g of aromatic polyimide powder (theoretical yield: 98.6%).

According to transmission electron microscope observation, this aromatic polyimide powder had a 2-layer structure consisting of crystalline polyimide particles the entire surface of which was covered with a coating layer of an amorphous polyimide, and the polymer had an inherent viscosity (30° C., 0.5 g/100 ml concentrated sulfuric acid) of 0.62, an average particle size (primary particles) of 6 μm, and a crystalline degree of 38% according to analysis by wide-angle X-ray spectrometry (Ruland method). Also, no glass transition point was observed up to 400° C. This polyimide powder was designated as polyimide powder A.

COMPARATIVE EXAMPLE 1

The same procedure was repeated as in Example 1, except that 164.53 g (0.559 mole) of s-BPDA was used alone as the tetracarboxylic acid component without a-BPDA. The resulting powder was obtained in an amount of 202.5 g (theoretical yield: 98.8%), and the polyimide powder had an inherent viscosity of 0.65, an average particle size of 8 μm, a crystalline degree of 43%, and no glass transition point was observed up to 400° C. This polyimide powder was designated as polyimide powder B.

COMPARATIVE EXAMPLE 2

The same procedure was repeated as in Example 1, except that 164.53 g (0.559 mole) of a-BPDA was used alone as the tetracarboxylic acid component without s-BPDA.

Instead of a powder, only a paste-like solid portion was obtained.

EXAMPLE 2

A cylindrical mold (diameter: 60 mm, height: 60 mm) was filled with polyimide powder A and placed in an oven preheated to 350° C. for pre-calcining under reduced pressure for about 3 hours, and then the pre-calcined polyimide powder was subjected to a pressure of 2000 $Kg/cm^2$ at 350° C. for 10 minutes, after which it was heated to a temperature of 480° C. over about 120 minutes at the same pressure, and this pressure and temperature were maintained for 30 minutes, during which time the main calcining was accomplished for degassing of the volatile substances; then, upon cessation of the pressure and removal from the compression molding machine, the molded body was further subjected to post-sintering in an oven at 450° C. for 2 hours and then allowed to cool, to obtain a polyimide powder molded body (cylinder with a diameter of 60 mm and a height of 10 mm).

The polyimide powder molded body was worked by cutting to create a panel (test piece) from the polyimide powder molded body which was then subjected to a flexural test. The flexural strength was 1700 $Kg/cm^2$. The powder molded body exhibited satisfactory cutting workability (secondary workability).

COMPARATIVE EXAMPLE 3

A polyimide powder molded body was obtained by hot compression molding which was carried out in the same manner as in Example 2, except for using polyimide powder B as the polyimide powder.

The flexural strength of the molded body was 1070 $Kg/cm^2$.

EXAMPLE 3

Polyimide powder A was placed in an oven preheated to 300° C. for pre-calcining under normal pressure for about one hour and was then filled into a cylindrical mold (diameter: 30 mm, height: 30 mm) and subjected to a pressure of 2000 $Kg/cm^2$ at normal temperature for 10 minutes, and after release of the pressure the molded body taken from the mold was placed in an oven preheated to 300° C. and raised to a temperature of 480° C. over about 120 minutes, and after maintaining this temperature for 30 minutes, the molded body was allowed to cool to obtain a polyimide powder molded body (cylinder with a diameter of 30 mm and a height of 3 mm).

This polyimide powder molded body was worked by cutting to create a test piece. The tensile strength of the test piece was 850 $Kg/cm^2$.

COMPARATIVE EXAMPLE 4

A polyimide powder molded body was obtained in the same manner as Example 3 except that polyimide powder B was used.

The tensile strength of this molded body was 450 Kg/cm².

EXAMPLE 4

The elongation of the powder molded body was evaluated in terms of relative values for the molded bodies obtained in Comparative Example 3 and Example 3 (with the molded body of Comparative Example 3 as 1), and this resulted in a value of 2.5.

When the powder molded bodies obtained in Examples 2 and 3 and Comparative Examples 3 and 4 were evaluated for heat resistance by thermogravimetric reduction, for dimensional stability by heat shrinkage and for compressive strength by compression test (according to ASTM D-695), they were all found to have satisfactory heat resistance, with no substantial difference between them.

EXAMPLE 5

A polyimide powder was obtained in the same manner as in Example 1, except that the proportion of s-BPDA and a-BPDA was changed to 98:2 (molar ratio).

Similar to the polyimide powder obtained in Example 1 (polyimide powder A), this polyimide powder had a 2-layer structure consisting of crystalline polyimide particles of which roughly the entire surface was covered with a coating layer of an amorphous polyimide, and the polymer had an inherent viscosity of 0.62, an average particle size of 6 μm, and a crystalline degree (overall) of 36%. Also, no glass transition point was observed up to 400° C.

This polyimide powder was used for compression molding in the same manner as Example 2, and measurement of the flexural strength of a test piece thereof gave a flexural strength of 1200 Kg/cm².

EXAMPLE 6

A polyimide powder was obtained in the same manner as in Example 1, except that the proportion of s-BPDA and a-BPDA was changed to 85:15 (molar ratio).

Similar to the polyimide powder obtained in Example 1 (polyimide powder A), this polyimide powder had a 2-layer structure consisting of crystalline polyimide particles the entire surface of which was covered with a coating layer of an amorphous polyimide, and the polymer had an inherent viscosity of 0.63, an average particle size of 6 μm, and a crystalline degree (overall) of 28%. Also, no glass transition point was observed up to 400° C.

This polyimide powder was used for compression molding in the same manner as Example 2, and measurement of the flexural strength of a test piece thereof gave a flexural strength of 1570 Kg/cm².

The present invention having the construction described in detail above provides the following effects.

That is, according to the process of the invention it is possible to obtain aromatic polyimide powder molded bodies with high levels for both mechanical characteristics and elongation, without reduction in heat resistance, dimensional stability or compressive strength.

Also, the aromatic polyimide powder of the invention undergoes sufficient polymer fusion between the powder particle surfaces during molding to achieve mutual fusion for bonding, and this gives molded products with a balance of high heat resistance, mechanical strength and elongation.

We claim:

1. A process for producing a polyimide powder molded body comprising: filling a mold with an aromatic polyimide powder which includes a solid portion consisting mainly of a highly heat resistant crystalline aromatic polyimide with no observed glass transition point in the temperature range from room temperature to 400° C., wherein the solid portion is covered with a coating layer consisting of an amorphous polyimide, the polyimide powder having an inherent viscosity of at least 0.4, measured at 30° C. and 0.5 g/100 ml in concentrated sulfuric acid, and a degree of crystallinity which can be confirmed by wide-angle X-ray spectrometry; and then applying pressure and temperature, either simultaneously or separately, to accomplish molding.

2. The process for producing a polyimide powder molded body according to claim 1, wherein the aromatic polyimide powder has a lower degree of crystallinity than a highly heat resistant crystalline aromatic polyimide alone as measured by wide-angle X-ray spectrometry, the powder has no observed glass transition point in the temperature range from room temperature to 400° C.

3. The process for producing a polyimide powder molded body according to claim 1, wherein the aromatic polyimide powder comprises an aromatic tetracarboxylic acid component composed of 3,3',4,4'-biphenyltetracarboxylic dianhydride and 2,3,3',4'-biphenyltetracarboxylic dianhydride and an aromatic diamine component containing para-phenylenediamine at a proportion of at least about 80 molar percent, wherein the 2,3,3',4'-biphenyltetracarboxylic acid component constitutes between 0.5 and 30 molar percent of the total amount of tetracarboxylic acid components, and the average particle size is 0.5–100 μm.

4. The process for producing a powder molded body according to claim 1, wherein the molding of the aromatic polyimide powder is accomplished by hot compression molding at a molding temperature of 200–600° C. and a molding pressure of 300–10,000 Kg/cm², or by subjecting a pre-molded product obtained by molding at room temperature to 350° C. and a molding pressure of 300–10,000 Kg/cm² to post-sintering at 200–600° C. under no compression.

5. An aromatic polyimide powder comprising: a solid portion consisting mainly of a highly heat resistant crystalline aromatic polyimide with no observed glass transition point in the temperature range from room temperature to 400° C., wherein the solid portion is covered with a coating layer consisting of an amorphous polyimide, the polyimide powder having an inherent viscosity of at least 0.4, measured at 30° C. and 0.5 g/100 ml in concentrated sulfuric acid, and a degree of crystallinity which can be confirmed by wide-angle X-ray scattering.

6. The aromatic polyimide powder according to claim 5, which has an average particle size for primary particles of 0.5 to 100 μm.

7. The aromatic polyimide powder according to claim 5, which is obtained from 2,3,3',4'-biphenyltetracarboxylic acid and 3,3',4,4'-biphenyltetracarboxylic acid, comprising 2,3,3',4'-biphenyltetracarboxylic acid in a proportion of 0.5 to 30 molar percent.

8. The aromatic polyimide powder according to claim 5, which is obtained by forming fine particles of a highly heat resistant crystalline aromatic polyimide upon polymerization and imidization and insolubilizing an amorphous aromatic polyimide to precipitate a powder, and then, recovering the powder.

* * * * *